(12) United States Patent
Ayasse

(10) Patent No.: US 8,053,481 B2
(45) Date of Patent: Nov. 8, 2011

(54) LOW-PRESSURE FISCHER-TROPSCH PROCESS

(75) Inventor: Conrad Ayasse, Calgary (CA)

(73) Assignee: WM GTL, Inc., Houston, TX (US)

( * ) Notice: Subject to any disclaimer, the term of this patent is extended or adjusted under 35 U.S.C. 154(b) by 395 days.

(21) Appl. No.: 12/318,106

(22) Filed: Dec. 22, 2008

(65) Prior Publication Data

US 2009/0124713 A1    May 14, 2009

Related U.S. Application Data

(63) Continuation-in-part of application No. 11/594,209, filed on Nov. 8, 2006, now abandoned.

(51) Int. Cl.
*C07C 27/00*    (2006.01)

(52) U.S. Cl. ........ 518/715; 518/700; 518/701; 518/702; 518/703; 518/704

(58) Field of Classification Search .......... 518/700–704, 518/715
See application file for complete search history.

(56) References Cited

U.S. PATENT DOCUMENTS

| | | | | |
|---|---|---|---|---|
| 4,801,573 A | * | 1/1989 | Eri et al. | 502/302 |
| 6,759,439 B2 | * | 7/2004 | Chao et al. | 518/715 |
| 7,452,844 B2 | | 11/2008 | Hu et al. | |
| 2001/0047040 A1 | * | 11/2001 | Agee et al. | 518/704 |
| 2005/0119116 A1 | | 6/2005 | Espinoza et al. | |
| 2006/0135629 A1 | * | 6/2006 | Abbott et al. | 518/702 |

FOREIGN PATENT DOCUMENTS

CA    2567425 A1    5/2008

OTHER PUBLICATIONS

Handbook of Petroleum Refining Processes, Third Edition (Weick et al. and Schrauwen) McGraw-Hill, 2004—Chapters 15.2 and 15.3.

* cited by examiner

*Primary Examiner* — Jafar Parsa
(74) *Attorney, Agent, or Firm* — Gowling Lafleur Henderson LLP; D. Doak Horne

(57) ABSTRACT

A Fischer-Tropsch process for producing diesel fuel or diesel blending stock with a high cetane number, in a concentration of 65-90 wt % at pressures below 200 psia, using a cobalt catalyst with a rhenium and/or ruthenium promoter. The catalyst is a cobalt catalyst with crystallites having an average diameter greater than 16 nanometers, and the resulting hydrocarbon product after a rough flash, contains less than 10 wt % waxes ($>C_{23}$).

38 Claims, 11 Drawing Sheets

LOW-PRESSURE FISCHER-TROPSCH PROCESS

RELATED APPLICATIONS

This application is a continuation-in-part of U.S. patent application Ser. No. 11/594,209 filed Nov. 8, 2006, of which is incorporated herein by reference in its entirety and for all its teachings, disclosures and purposes.

FIELD OF THE INVENTION

This invention relates to a Fischer-Tropsch process for converting carbon monoxide and hydrogen to diesel fuel or diesel blending stock with a high cetane number in a concentration of 65-90+ wt %, at pressures below 200 psia, using a particular defined cobalt catalyst with crystallites of a size greater than 16 nanometers.

BACKGROUND OF THE INVENTION i) Overview

The Fischer-Tropsch (FT) process for converting carbon monoxide and hydrogen to liquid motor fuels and/or wax has been known since the 1920's.

During the Second World War synthetic diesel was manufactured in Germany using coal gasification to supply a 1:1 ratio of hydrogen and carbon monoxide for conversion to fuel hydrocarbons. Because of trade sanctions and the paucity of natural gas, South Africa further developed the coal via gasification route to synthesis gas and employed a fixed-bed iron Fischer-Tropsch catalyst. Iron catalysts are very active for the water-gas shift reaction which moves the gas composition from a deficiency of hydrogen and closer to the optimum $H_2/CO$ ratio of around 2.0. When large natural gas supplies were developed, steam and autothermal reformers were employed to produce the synthesis gas feedstock to slurry-bed FT reactors using cobalt or iron catalysts.

In Gas-To-Liquids (GTL) plants, compromises must be made between liquid product yield and plant operating and capital costs. For example, if there is a market for electricity, a steam reformer design may be chosen because this technology produces a large amount of waste heat: flue gas heat can be converted to electricity using an 'economiser' and steam turbine. If conservation of natural gas feedstock and low capital cost are paramount, autothermal or partial oxidation reformers using air are favored.

Another factor in selecting the best reformer type is the nature of the reformer hydrocarbon feed gas. If the gas is rich in $CO_2$, this can be advantageous because the desired $H_2/CO$ ratio can then be achieved directly in the reformer gas without the need to remove excess hydrogen, and some of the $CO_2$ is converted to CO, increasing the potential volume of liquid hydrocarbon product that can be produced. Additionally, the volume of steam that is required is reduced, which reduces the process energy requirements.

The market for Fischer-Tropsch (FT) processes is concentrated on large "World-Scale" plants with natural gas feed rates of greater than 200 million scfd because of the considerable economies if scale. These plants operate at high-pressure, about 450 psia, and use extensive recycling of tail gas in the FT reactor. For, example, the Norsk Hydro plant design has a recycle ratio of about 3.0. The emphasis is on achieving the maximum wax yield. In terms of product slate, these large plants strive for the maximum yield of FT waxes in order to minimize the formation of $C_1$-$C_5$ products. The waxes are then hydrocracked to primarily diesel and naphtha fractions.

Unfortunately, light hydrocarbons are also formed in this process. The reformers use some form of autothermal reforming with oxygen produced cryogenically from air, an expensive process in terms of operating cost and capital cost. The economies of scale justify the use of high operating pressure, the use of oxygen natural gas reforming, extensive tail gas recycling to the FT reactor for increasing synthesis gas conversion and controlling heat removal and product wax hydrocracking. To date, an economical FT plant design has not been developed for small plants with capacities of less than 100 million scfd.

The present invention strives for optimized economics in a completely different market: small FT plants using less than 100 million scfd. The emphasis is on simplicity and minimized capital cost, somewhat at the expense of efficiency.

| ii) Existing FT Technologies | Technology of this invention |
|---|---|
| Large plants, >25 MMscfd | Small plants, <100 MMscfd |
| High pressure, >200 psia | Low pressure, <200 psia |
| Oxygen to reformer | Air to reformer |
| Extensive recycling to FT reactor or reformer | No recycling ("once-through" process) |
| Low single-pass FT CO conversion (<50%) | High single-pass conversion (>65%) |
| Deliberate and extensive wax formation | Less than 10% wax formation |
| Hydrocracking waxes | No hydrocracking operations |
| Multiple-pass FT reactors | Single-pass-FT reactor |
| Low FT diesel yield (<50%) | High diesel yield (55-90% of hydrocarbon liquid) | iii) Prior Art

The catalytic hydrogenation of carbon monoxide to produce a variety of products ranging from methane to heavy hydrocarbons (up to $C_{80}$ and higher) as well as oxygenated hydrocarbons is usually referred to as Fischer-Tropsch synthesis. The high molecular weight hydrocarbon product primarily comprises normal paraffins which can not be used directly as motor fuels because their cold properties are not compatible. After further hydroprocessing, Fischer-Tropsch hydrocarbon products can be transformed into products with a higher added value such as diesel, jet fuel or kerosene. Consequently, it is desirable to maximize the production of high value liquid hydrocarbons directly to that component separation or hydrocracking are not necessary.

Catalytically active group VIII, in particular, iron, cobalt and nickel are used as Fischer-Tropsch catalysts; cobalt/ruthenium is one of the most common catalyzing systems. Further, the catalyst usually contains a support or carrier metal as well as a promoter, e.g., rhenium.

Metal oxides, e.g., silica, alumina, titania, zirconia or mixture thereof, have been utilized as catalyst supports in Fischer-Tropsch hydrocarbons synthesis. U.S. Pat. No. 4,542,122 disclosed a cobalt or cobalt thoria on titania as a hydrocarbon synthesis catalyst. U.S. Pat. No. 4,088,671 disclosed a cobalt-ruthenium catalyst where alumina was used as a support. European Pat. No. 142,887 described a silica supported cobalt catalyst together with zirconium, titanium, ruthenium and/or chromium.

U.S. Pat. No. 4,801,573 described a promoted cobalt and rhenium catalyst supported on alumina. The amount of cobalt is most preferably about 10-40 wt % of the catalyst. However, rhenium is preferably about 2-20 wt of cobalt content. U.S. Pat. No. 5,248,701 disclosed a copper promoted cobalt-manganese spinel that was said to be useful as a Fischer-Tropsch catalyst with selectivity for olefins and higher paraffins.

U.S. Pat. No. 4,738,948, issued in Apr. 19, 1988, describes a catalyst comprising cobalt ruthenium at an atomic ratio of 10-400, on a refractory carrier, such as titania or silica. The catalyst is used for conversion of synthesis gas with an $H_2$:CO ratio of 0.5-10, preferably 0.5-4, to $C_5$-$C_{40}$ hydrocarbons at a pressure of 80-600 psig and at a temperature of 160-300° C., at a gas hourly space velocity of 100-5000 v/hr/v.

U.S. Pat. No. 2003/0134912 A1 published Jul. 17, 2003 describes a Fischer-Tropsch process that uses an activated carbon support to limit formation of heavier components by size exclusion. The product is segregated into three (3) boiling fractions, which are then re-combined to make diesel. The diesel is not made as a direct product exiting the Fischer-Tropsch reactor.

U.S. Pat. No. 4,801,573, issued Jan. 31, 1989 (expired), described a catalyst of cobalt and rhenium deposited on alumina. The reaction products are a complicated mixture that follow the Shulz-Flory distribution.

After a period of time in operation, a catalyst becomes deactivated, losing its effectiveness for synthesis gas conversion. Among the main deactivation mechanisms for cobalt based catalysts are sulfur poisoning [e.g. R. L. Espinoza, et al, Applied Catalysis A:General 186 (1999)13], metal oxidation [e.g. D. Schanke et al, Catal. Lett. 34 (1995) 269] and surface condensation of heavy hydrocarbons [e.g. E. Iglesia et al, J. Catal. 143 (1993)345].

U.S. Pat. No. 5,728,918, issued on Mar. 17, 1998, described a catalyst comprising cobalt on a support, used for conversion of synthesis gas with an $H_2$:CO ratio of 1-3, preferably 1.8-2.2, to $C_5^+$ hydrocarbons at a pressure of 1-100 bar and at a temperature of 150-300° C., at a typical gas hourly space velocity of 1000-6000 v/hr/v. Generation Activation of this catalyst was achieved by using a gas containing carbon monoxide and less than 30% hydrogen at a temperature more than 10° C. above Fischer-Tropsch conditions in the range 100-500° C. at a pressure of 0.5-10 bar, for air, at least 10 min preferably 1-12 hours.

U.S. Pat. No. 2,471,288 refers to the use of a alumina as a catalyst for cracking gas oil, while a Polish paper published in Przemysl Chemiczny (2004), 83 (3) pp. 137-140 describes the use of $CoAl_2O_3$ for the purpose of cracking propane. Clearly, cobalt and alumina have paraffin cracking activity.

Fischer-Tropsch synthesis performed at low pressure, 17-21 atmospheres, and relatively high temperature, usually produces short chain hydrocarbons of 0.6-0.7 chain growth probability factor. U.S. Pat App. No. 20050209348 published on Sep. 22, 2005, described a Fischer-Tropsch process performed at an elevated temperature between 230-280° C., for example 240° C. and at elevated pressure typically between 1.7 MPa and 2.1 MPa, for example 1.8 MPa, using a compact reactor. The preferred catalyst comprised a coating of gamma alumina support with 10-40% cobalt (by weight compared to the alumina) and with a promoter such as ruthenium, platinum or gadolinium which is less than 10% of the cobalt weight. The gas hourly space velocity was very high, for example 20000 $hr^{-1}$ and the produced hydrocarbon liquid consisted of saturated linear alkanes of chain lengths range between about 6-17. Consequently, it is rich in aircraft fuel. However, the selectivity to the production of $C_5^+$ hydrocarbon was less than 65% and the conversion of carbon monoxide was no greater than 75%.

Hence, there is still a great need to identify other Fischer-Tropsch processes which can be used to directly produce different types of fuel such as, diesel fuel.

SUMMARY OF THE INVENTION

In the Fischer-Tropsch process, it has been found various parameters such as the size and shape of cobalt crystallites affect the activity of cobalt supported catalysts. The size of metal crystallites controls the number of active sites available for reduction (dispersion) and degree of reduction. It has been shown that the catalyst support type ($\gamma Al_2O_3$, $SiO_2$ and $TIO_2$, etc.) and structure greatly affect the shape, size, dispersion and reducibility of cobalt metal clusters, and hence C5+ selectivity. Furthermore, the support pore size distribution, pore shape, average pore diameter, pore volume and surface area influence the cobalt supported catalyst's activity. In fact, different batches of the same support but with various pore size distributions can result in cobalt supported catalysts of different C5+ selectivity.

Under certain pretreatment and activation conditions, a strong interaction between cobalt metal and oxide supports forms undesirable cobalt-support structures, for example, cobalt aluminate, which may require high reduction temperature. High reduction temperature can result in sintering cobalt crystallites and forming large cobalt metal clusters. Not only temperature treatments, but also cobalt metal precursors and metal loading, as well as metal promoters affect the size of cobalt crystallites. Low cobalt metal loading could result in high metal dispersion and small crystallites but enhances the metal-support interaction leading to poor reducibility and low catalyst activity.

Hydrogenation of carbon monoxide using cobalt supported catalyst is directly proportional to the amount of exposed cobalt atoms. Therefore, increasing cobalt metal dispersion on the oxide support surface, logically, enhances the catalyst activity and C5+ selectivity. However, small cobalt crystallites strongly interact with the oxide support forming unreducible cobalt-support systems. The strong correlation between cobalt metal crystallites and reducibility influences the catalyst activity and may produce undesirable products. Under typical Fischer-Tropsch reaction conditions cobalt crystallite size range (9-200 nm) and dispersion range (11-0.5%) have minor influence on C5+ selectivity. Nevertheless, smaller cobalt crystallites suffer from serious deactivation. In fact, Barbie et. al 2000 studied the correlation between the deactivation rate and cobalt crystallite size and observed a peak at 5.5 nm.

The invention in one broad aspect comprises a low-pressure Fischer-Tropsch process and a catalyst that produces a high diesel-fraction yield. Process pressure is below 200 psig. The catalyst is cobalt deposited at greater than 5 weight percent on gamma alumina, optionally along with rhenium or ruthenium at 0.01-2 wt. %. It has been discovered that this catalyst is very effective at low pressures in converting synthesis gas into diesel in high yield. The present invention is particularly well suited to conversion of low pressure gases containing low molecular weight hydrocarbons into FT liquids. Examples of applications are landfill gas, oil field solution gas and low pressure gas from de-pressured gas fields. In all these cases, multiple-stage gas and air compression would be required in traditional FT plants. The high efficiency of the present FT catalyst enables high CO conversion and produces a product stream containing up to 90+ wt. % diesel in a single pass. The use of air in the natural gas reformer provides a synthesis gas containing approximately 50% nitrogen, which facilitates heat removal in the FT reactor as sensible heat and increases gas velocity and heat transfer efficiency, so that tail gas recycling is not needed. Naphtha can be partially separated from the hydrocarbon product by flash distillation at low cost to generate a more pure diesel product. This also serves to provide some product cooling. The liquid hydrocarbon product is excellent for blending with petroleum diesel to increase cetane number and reduce sulfur content.

Advantageously, it has been experimentally been determined that the Fischer-Tropsch process (hereinafter "FT process") of the present invention is particularly effective using a cobalt catalyst comprised of crystallites, wherein said crystallites have an average diameter greater than 16 nanometers. Diesel fuel or diesel blending stock with high cetane number is produced as a Fischer-Tropsch product in a concentration of 65-90+ weight percent at pressures below 200 psia using a cobalt catalyst having such crystallites, in combination with rhenium and/or ruthenium promoter. After a rough flash, a substantially pure diesel can be produced.

In all Figures showing graphs of carbon numbers, naphtha is indicated by large squares, diesel by diamonds and light waxes by small squares.

DETAILED DESCRIPTION OF THE PREFERRED EMBODIMENT

In order to operate the FT process at high conversions with oxygen-blown reformer synthesis gas, the approach has been to recycle tail gas in a high proportion—at a ratio of 3.0 or greater based on fresh gas feed. A secondary benefit is that the fresh gas is diluted in carbon monoxide, which reduces the required rate of heat removal from the FT reactor, reduces hot-spoting and improves the product slate. However, tailgas recycling is a very energy and capital intensive activity. The separation of oxygen from air is also an energy and capital intensive activity.

The approach taken in the present process is to use air in the reformer, which gives a synthesis gas containing approximately 50% nitrogen as inert diluent, eliminating the need for tail gas recycling to moderate FT reactor heat removal requirements. Others employing air-blown synthesis gas in FT processes have achieved the desired high CO conversions by using multiple FT reactors in series, which entails high capital costs and complex operation. The present process achieves high CO conversion in a simple single pass and a high diesel cut by using a special catalyst as more particularly described below.

The catalyst of the present invention in a preferred embodiment employs an alumina support with high cobalt concentration, along with a low level of rhenium to facilitate catalyst reduction. The high cobalt concentrations increase catalyst activity, enabling high single-pass synthesis gas conversion.

The Anderson-Shultz-Florey theory predicts the FT hydrocarbons to cover a very wide range of carbon numbers, from 1-60, whereas the most desirable product is diesel fuel ($C_9$-$C_{23}$, Chevron definition). In order to reduce the 'losses' of CO to making $C_1$-$C_5$ hydrocarbons, a common approach is to strive to make mostly wax in the FT reactor and then, in a separate operation, to hydrocrack the wax to mostly diesel and naphtha. Surprisingly, the process and catalyst of the present invention makes diesel in high yield (to 90 wt %) directly in the FT reactor, obviating the need for expensive and complex hydrocracking facilities.

Because of the elimination of oxygen purification, high-pressure compression, tail gas recycling and hydrocracking, the present process can be applied economically in much smaller plants than hitherto considered possible for FT technology.

Figure 1:
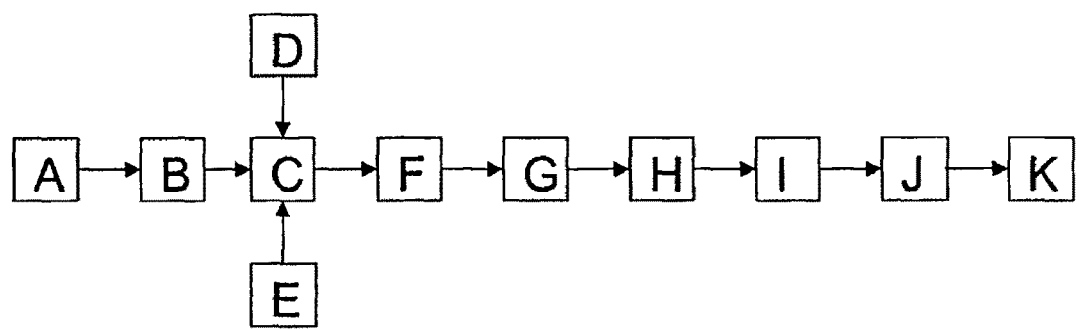
FIG. 1 is a process flow diagram for a particular embodiment of the invention.

FIG. 1 shows the process flow diagram for the present invention, wherein the letters A-k signify the following:
A Raw hydrocarbon-containing gas
B Gas conditioning equipment
C Reformer
D Water
E Air or oxygen
F Cooler
G Water removal
H hydrogen removal (optional)
I Fischer Tropsch reactor
J Back-pressure regulator
K Product cooling and recovery (2-options)

Letter A represents the raw hydrocarbon-containing process feed gas. This could be from a wide variety of sources: for example, from a natural gas field, a land-fill facility (biogenic gas), a petroleum oil processing facility (solution gas), among others. The pressure of the gas for the present process can vary widely, from atmospheric pressure to 200 psia or higher. Single-stage or two-stage compression may be required, depending on the source pressure and the desired process operating pressure. For example, for landfill gas, the pressure is typically close to atmospheric pressure and blowers are used to transmit the gas into combustion equipment. Solution gas, which is normally flared, must also be compressed to the process operating pressure. There are also many old exploited and late-life natural gas fields with pressure too low for acceptance into pipelines that could make possible feedstock for the present process. Other natural gas sources, which may or may not be stranded (no access to a pipeline) may already be at or above the desired process operation pressure and these are also candidates. Another candidate is natural gas that is too high in inerts such as nitrogen to meet pipeline specifications.

Letter B represents hydrocarbon gas conditioning equipment. The gas may require clean-up to remove components that would damage reformer or FT catalyst. Examples of these are mercury, hydrogen sulfide, silicones and organic chlorides. Organic chlorides, such as found in land-fill gas, produce hydrochloric acid in the reformer, which can cause severe corrosion. Silicones form a continuous silicon dioxide coating on the catalyst, blocking pores. Hydrogen sulphide is a powerful FT catalyst poison and is usually removed to 1.0 ppm or lower. Some gas, from sweet-gas fields, may not require any conditioning (clean-up).

The hydrocarbon concentration in the raw gas affects the economics of the process because less hydrocarbon product is formed from the same volume of feed gas. Nevertheless, the process can operate with 50% or lower methane concentration, for example, using land-fill gas. There may even be reasons to operate the process even at a financial loss: for example to meet greenhouse gas government or corporate emission standards. The process can operate with feed gases containing only methane hydrocarbon or containing natural gas liquids by the application of known reformer technologies. The presence of carbon dioxide in the feed gas is beneficial.

Letter C represents the reformer, which may be of several types depending on the composition of the feed gas. A significant benefit of low pressure reformer operation is the lower rate of the Brouard reaction and diminution of metal dusting.

Partial oxidation reformers normally operate at very high pressure ie. 450 psia or greater, and so are not optimum for a low-pressure FT process. It is energetically inefficient, and can easily make soot, however, it does not require water, and makes a syngas with a $H_2/CO$ ratio near 2.0, optimum for FT catalysts. Partial oxidation reformers may be employed in the present process.

Steam reformers are capital expensive and require flue gas heat recovery to maximize efficiency in large plants. Because the synthesis gas contains relatively low levels of inerts such as nitrogen, temperature control in the FT reactor can be difficult without tail gas recycling to the FT reactor. However, the low level of inerts enables recycling of some tail gas to the reformer tube-side, supplementing natural gas feed, or to the shell side to provide heat. Keeping in mind that FT tail gas must be combusted before venting in any event, this energy can be used for electrical generation or, better yet, to provide the reformer heat which would be otherwise be provided from burning natural gas. For small FT plants, steam reformers are a viable choice. Steam reformers may be employed in the present process.

Autothermal reforming is an efficient process of relatively low capital cost that uses moderate temperatures and modest steam concentrations to produce a soot-free synthesis gas with $H_2/CO$ around 2.5 using low-$CO_2$ natural gas feed, which is closer to the desired ratio than for steam reforming. However some hydrogen removal is still required for most natural gas feeds. If the feed gas contains greater than about 33% $CO_2$, as is the case with land-fill gas feed, then an $H_2/CO$ ratio of 2.0 can be achieved without any recycle streams, and the water use can also be diminished. This is the most desired type of reformer for the present low-pressure FT processes.

Letter D represents the optional water that is injected as steam into the reformer. All reformer technologies except partial oxidation require the injection of steam.

Letter E represents an oxidizing gas, which could be air, oxygen or oxygen-enriched air.

Letter F represents a cooler for reducing the reformer outlet temperature from greater than 800° C. to close to ambient. The cooling may be done in several stages, but preferably in a single stage. The cooling may be achieved with shell-and-tube or plate-and-frame heat exchangers and the recovered energy may be utilized to pre-heat the reformer feed gases, as is well known in the industry. Another way of cooling the reformer tail gas is by direct injection of water into the stream or by passing the stream through water in a vessel.

Letter G represents a separator for separating the reformer synthesis gas from condensed water, so as to minimize the amount of water entering downstream equipment.

Letter H represents optional hydrogen removal equipment such as Prism™ hydrogen-selective membranes which are sold by Air Products, or Cynara membranes from Natco.

Certain reformer processes produce a synthesis gas too rich in hydrogen, some of which must be removed to achieve optimum FT reactor performance. An ideal $H_2/CO$ ratio is 2.0-2.1, whereas the raw synthesis gas may have a ratio of 3.0 or higher. High hydrogen concentrations give rise to larger CO loss to producing methane instead of the desired motor fuels or motor fuel precursor such as naphtha.

Letter I represents typical FT reactors, which are of the fixed-bed or slurry bubble type and either may be used. However, the fixed-bed is preferred because if its simplicity of operation and ease of scale-up.

Letter J represents a back-pressure controller which sets the process pressure. It may be placed in other locations depending on the product recovery and possible partial separation process employed.

Figure 2:
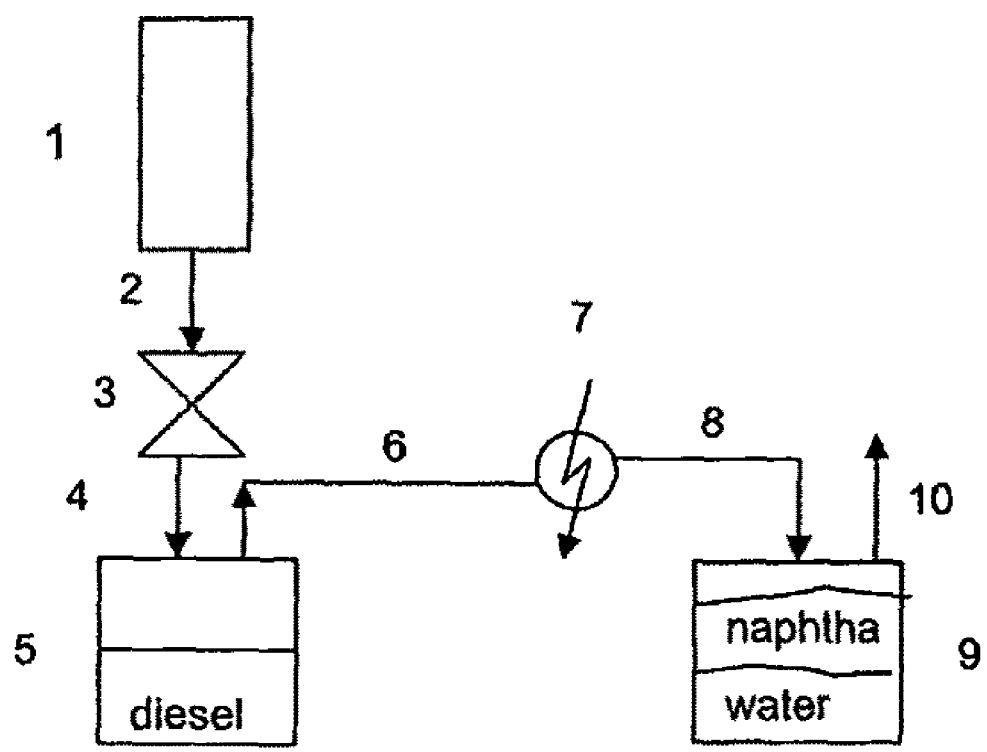
FIG. 2 is a flow diagram for flash separation of naphtha and diesel hydrocarbon fractions as a subsequent step to the Fischer-Tropsch process of the present invention.

Letter K represents product cooling and recovery. Product cooling is typically accomplished by heat exchange with cold water and serves to pre-heat the water for use elsewhere in the FT plant. Separation is accomplished in a separator vessel designed for oil/water separation. However a second alternative is to flash-cool the FT reactor product before the aforementioned cooler-separator as shown in FIG. 2. This serves two purposes—firstly to reduce the product temperature and secondly to enable partial separation of the naphtha component in the produced hydrocarbon product, enriching the remaining liquid in the diesel component.

FIG. 2 shows a process diagram, for flash separation of naphtha and diesel hydrocarbons, in which:

1 is a fixed-bed Fischer Tropsch reactor.

2 is a mixture of gases, water, naphtha, diesel and light waxes at ca. 190-240° C. and pressure greater than atmospheric.

3 is a pressure let-down valve.

4 is stream 2 at reduced temperature due to gas expansion and at 14.7 psia.

5 is a flash drum vessel.

6 is a vapour phase consisting of stream 2 minus diesel and light waxes.

7 is a cooler.

8 is stream 6 with naphtha and water in the liquid phase.

9 is a vessel to retain naphtha and water.

10 is a waste tailgas stream consisting mainly of inert gases and light hydrocarbons.

The FT products 2 flow through a pressure let-down valve 3 and into a flash drum 5. The inert gases and lower-boiling hydrocarbons, water and naphtha go overhead as vapour out of the flash drum and through cooler 7. The diesel and light waxes collect in vessel 5. The water and naphtha condense in cooler 7 and are collected in vessel 9. The remaining gases exit overhead in stream 10 and are typically combusted, sometimes with energy recovery, or are used to generate electricity.

EXAMPLES

TABLE 1

Physical characteristics of alumina catalyst supports

| | Alumina catalyst support | | | | |
|---|---|---|---|---|---|
| | Alcoa LD-5 | Alcoa CSS-350 | Alcoa F-220 | Sasol (Trilobes) | Degussa Aerolyst 3038 |
| Surface Area, $m^2/g$ | 300 min | 350 | 360 | 248 | 270 |
| Average Particle size, microns | various | 2120 | 2000 | 1670 × 4100 | 2500 |
| Pore Volume, cc/g | 0.63 | 0.57 | 0.5 | 0.82 | 0.9-1.0 |
| Bulk Density, g/cc | 0.465 | 0.72 | 0.769 | 0.42 | 0.40-0.46 |
| $Al_2O_3$, % wt | Diff. | 99.6 | 93.1 | Diff. | <500 ppm |
| $SiO_2$, % wt | 0.40 max | 0.02 | 0.02 | 0.015 | >99.8 |
| $Fe_2O_3$, % wt, max | 0.04 | — | 0.02 | 0.015 | <30 ppm |
| $Na_2O$, % wt, max | 0.2 | 0.35 | 0.3 | 0.05 | — |
| LOI (250-1100° C.), % wt | 23-30 | 3.5 | 6.5 | — | — |

Example 1

Catalyst synthesis was conducted by ordinary means as practiced by those knowledgable in the art. The catalyst support was alumina trilobe extrudate obtained from Sasol Germany GmbH (hereafter referred to as 'trilobe'). The extrudate dimensions were 1.67 mm diameter and 4.1 mm length. The support was calcined in air at 500° C. for 24 hours. A solution mixture of cobalt nitrate and perrhenic acid was added to the support by the method of incipient wetness to achieve 5 wt % cobalt metal and 0.5 wt. % rhenium metal in the finished catalyst. The catalyst was dried slowly and then heated in a convection oven at the rate of 1.0° C. per minute to 350° C. and held at that temperature for 12 hours. A volume of 29 cc of oxidized catalyst was placed in a ½ inch OD tube that had an outer annular space through which temperature-control water was flowed under pressure in order to remove the heat of reaction. In effect, the FT reactor was a shell-and-tube heat exchanger with catalyst placed in the tube side. The inlet gas and water were both at the targeted reaction temperature. Catalyst reduction was accomplished by the following procedure:

Reduction-gas flow rate (cc/min)/$H_2$ in nitrogen (%)/temperature (°C.)/time (hours):
1. 386/70/200/4, pre-heat stage
2. 386/80/to 325/4, slow heating stage
3. 386/80/325/30, fixed-temperature stage During Fischer-Tropsch catalysis, total gas flow to the FT reactor was at a GHSV of 1000 $hr^{-1}$. Gas composition was representative of an air-autothermal reformer gas: 50% nitrogen, 33.3% $H_2$ and 16.7% CO. A seasoning of the catalyst was used to reduce methane production. This was accomplished by holding the reactor temperature at 170° C. for the first 24 hours. Presumably, this process causes carbonylation of the cobalt surface and increased FT activity. CO conversion and liquid production were measured at a variety of temperatures between 190° C. and 220° C.

Example 2

The catalyst used was the same as Example 1, except that the cobalt metal loading was 10 wt %.

Example 3

The catalyst used was the same as Example 1, except that the cobalt metal loading was 15 wt %.

Example 4

The catalyst used was the same as Example 1, except that the cobalt metal loading was 20 wt %.

Example 5

The catalyst used was the same as Example 1, except that the cobalt metal loading was 26 wt %.

Example 6

The catalyst used was the same as Example 1, except that the cobalt metal loading was 35 wt %.

Example 7

The catalyst used was the same as used in Example 1, except that the alumina support was CSS-350, obtained from Alcoa, and the cobalt loading was 20 weight percent. This support is spherical with a diameter of 1/16 inch.

Example 8a, 8b, 8c & 8d

The catalyst used was the same as used in Example 1, except as follows: Catalyst 8a was identical to Catalyst 1, except that the alumina support was LD-5, obtained from Alcoa, and the cobalt loading was 20 weight percent. This support is spherical with an average particle distribution of 1963 microns. Example 8a used the particle size mixture as received. Some of the original particles were ground to smaller sieve sizes: Catalysts 8b, 8c and 8d were made with particles of diameter 214, 359 and 718 microns respectively. The cobalt loading in Examples 8b, 8c and 8d was identical to Example 8a.

Example 9

The catalyst used was the same as used in Example 1, except that the alumina support was F-220, obtained from Alcoa, and the cobalt loading was 20 weight percent. F-220 is a spherical support with a mesh size distribution of 7/14.

Example 10

The catalyst used was the same as used in Example 4, except that the promoter was ruthenium rather than rhenium.

Example 11

The catalyst used was the same as used in Example 3, except that Aerolyst 3038 silica catalyst support from Degussa was used instead of alumina.

Catalyst Characterization

The above catalysts were each analyzed for average crystallite size (d(CoO), Dispersion (D %) and Degree of Reduction (DOR) using a Chembet 3000 (Quantachrome Instruments) TPR/TPD analyzer. The catalyst was reduced at 325° C. in $H_2$ flow and cobalt dispersion was calculated assuming that one hydrogen molecule covers two cobalt surface atoms. Oxygen chemisorption was measured with a series of ($O_2$/He) pulses passed through the catalyst at 380° C. temperature after reducing the catalyst at 325° C. The up-take oxygen moles were determined and degree of reduction was calculated assuming that all cobalt metal was re-oxidized to $Co_3O_4$. Cobalt crystallite size was calculated from:

d(CoO)=(96/D %) DOR

D %: Dispersion

DOR: Degree of reduction

F-T Catalyst Evaluation (i) Influence of Cobalt Loading—Examples 1-6

The effect of Co loading on catalyst performance was tested with Examples 1-6 with the results shown in Table 2 (below).

TABLE 2

Effect of catalyst loading on performance on Examples 1-6 (trilobes) at 70 psia.

| | Weight % Cobalt (Example number) | | | | | |
|---|---|---|---|---|---|---|
| | 5 (1) | 10 (2) | 15 (3) | 20 (4) | 26 (5) | 35 (6) |
| Optimum Temperature, ° C. | 220 | 210 | 205 | 200 | 200 | 200 |
| Hydrocarbon Liquid Rate, ml/h | 0.09 | 0.54 | 0.74 | 1.03 | 0.77 | 0.86 |
| Naphtha, wt % | 6.4 | 8.8 | 13.9 | 17.9 | 16.4 | 15.8 |
| Diesel, wt % | 92.5 | 82.8 | 78.3 | 75.3 | 76.8 | 76.8 |
| Light wax, wt % | 1.1 | 8.4 | 7.8 | 6.9 | 6.8 | 7.4 |
| Diesel production, ml/h | 0.08 | 0.45 | 0.58 | 0.78 | 0.59 | 0.66 |
| CO Conversion, mol % | 19.4 | 42.0 | 61.2 | 85.1 | 82.8 | 83.1 |
| C5+ Selectivity, % | 28.6 | 80.6 | 71.3 | 68.0 | 65.1 | 64.3 |
| Cetane number | 81 | 79 | 77 | 76 | 74 | 75 |

Examples 1-6 were conducted at various temperatures, and the temperature that gave the largest amount of hydrocarbon product is listed. It is clear that 5% cobalt was not enough to provide a useful amount of liquid hydrocarbons: the best concentration was 20 wt % Co, which gave 1.03 ml/h. The concentration of diesel range hydrocarbons in the hydrocarbon product was 75.3-92.5% at cobalt loadings of 10 wt % cobalt or higher. The highest diesel production rate (0.78 ml/h) was achieved with the trilobe support with 20% cobalt at 70 psia.

The performance data for the catalyst of Example 4 at 202.5 is shown in Table 8. The level of wax (C>23) on the C5+ liquid was only 6.8% and the diesel fraction was 73.5% (C9-C23). It was found that for all catalysts of Examples 1-11 where the crystallite average diameter was greater than 16 nm, the C5+ wax was less than 10 weight %, enabling the product to be used directly as diesel blend.

Figure 3:
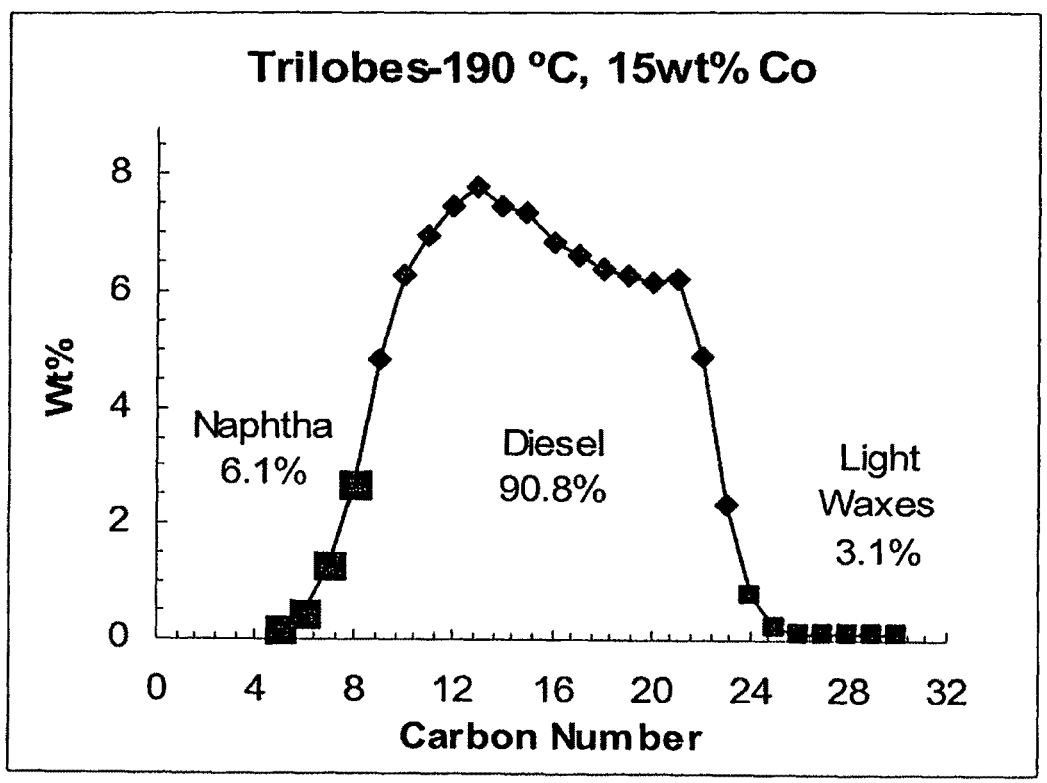
FIG. 3 is a graph showing C5+ carbon number distribution for the catalyst of Example 3 (trilobes) at 190° C.

FIG. 3 shows the carbon number distribution for the catalyst of Example 3 (trilobe) at 190° C. A very narrow distribution was obtained having no heavy wax. Diesel was 90.8%, naphtha 6.1% and light waxes 3.1%. Cetane number was very high at 88. In all graphs of carbon numbers, naphtha is indicated by large squares, diesel by diamonds and light waxes by small squares.

Influence of Pressure

Figure 4:
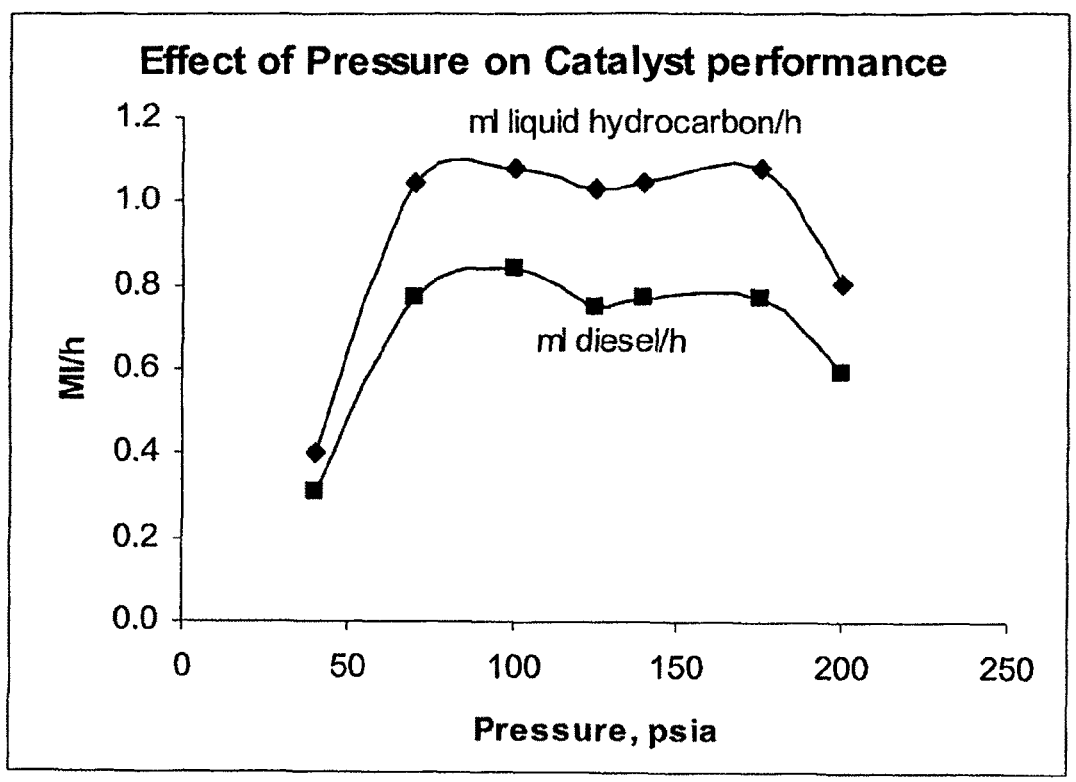
FIG. 4 is a graph showing the effect of pressure on the performance of the catalyst of Example 4.

The catalyst of Example 4 was run in the standard testing rig as described above at a temperature of 202.5° C. at a variety of pressures. Results in Table 3 (below) and FIG. 4 indicate that productivity of the catalyst for production of liquid hydrocarbons was significant at low pressures down to 70 psia, with the optimum results obtained at pressures between 70 psia and 175 psia. Preferred pressures are 70-350 psia and most preferably from 70 to 175 psia. The diesel fraction over that pressure range was fairly constant at 70.8-73.5 weight percent. As shown in Table 8, the catalyst of Example 4, with 20% cobalt had an average crystallite size of 22.26 nm and a C5+ wax fraction of 6.8 wt % enabling the product to be used as a diesel blend.

TABLE 3

Effect of pressure on catalyst performance (Example 4 catalyst, 202.5° C.).

| | Pressure, psia | | | | | | |
|---|---|---|---|---|---|---|---|
| | 40 | 70 | 100 | 125 | 140 | 175 | 200 |
| Hydrocarbon Liquid Rate, ml/h | 0.405 | 1.047 | 1.082 | 1.034 | 1.046 | 1.079 | 0.805 |
| Naphtha, wt % | 8.5 | 19.7 | 24.7 | 23.5 | 23.9 | 26.6 | 23.9 |
| Diesel, wt % | 77.8 | 73.5 | 71.9 | 73.1 | 73.4 | 70.8 | 74.1 |
| Light wax, wt % | 13.7 | 6.8 | 3.4 | 3.4 | 2.7 | 2.6 | 2.0 |
| Diesel production, ml/h | 0.32 | 0.77 | 0.78 | 0.76 | 0.77 | 0.76 | 0.60 |
| CO Conversion, mol % | 59.4 | 90.2 | 84.1 | 83.8 | 74.8 | 73.4 | 65.8 |
| C5+ Selectivity, % | 76.6 | 58.1 | 54.4 | 52.5 | 61.3 | 57.7 | 52.0 |

Example 7

Figure 5:
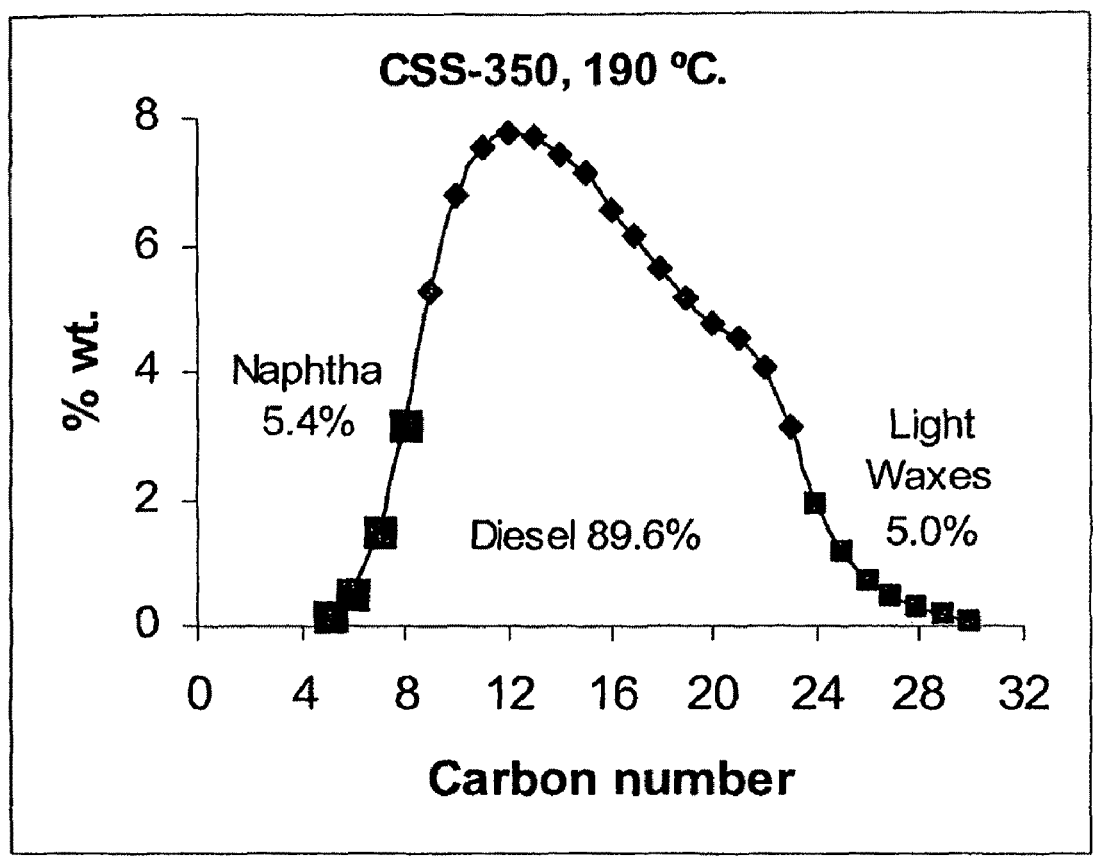
FIG. 5 is a graph showing the effect of carbon number on the % weight production of liquid fuels and/or waxes, at 190° C., 70 psia, using a CSS-350 alumina support (ie Example 7)

As seen in Table 4 (below), the maximum diesel production rate was achieved at 215° C. and 70 psia. Compared with the catalyst of Example 4, the catalyst of Example 7 gave a lower diesel production rate at its optimum temperature (215° C.), but a higher diesel fraction. FIG. 5 is a graph showing the effect of carbon number on the % weight production of liquid fuels and/or waxes, at 190° C., 70 psia, using a CSS-350 alumina support (ie Example 7). FIG. 5 shows the narrow carbon number range in the liquid product at 190° C., with 89.6% in the diesel range. Cetane number was 81. However, as shown in Table 8, the crystallite size was 18.26 nm, and the wax fraction was 7.2% enabling the product to be used as a diesel blend.

TABLE 4

Performance of Example 7 at various temperatures (CSS-350).

| | Temperature, ° C. | | | | |
|---|---|---|---|---|---|
| | 190 | 200 | 210 | 215 | 220 |
| Hydrocarbon Liquid Rate, ml/h | 0.55 | 0.58 | 0.64 | 0.70 | 0.68 |
| Naphtha, wt % | 5.4 | 15.2 | 13.4 | 15.4 | 14.3 |
| Diesel, wt % | 89.6 | 76.8 | 82.0 | 77.4 | 81.3 |
| Light wax, wt % | 5.0 | 8.0 | 4.6 | 7.2 | 4.4 |
| Diesel production, ml/h | 20.1 | 47.2 | 45.2 | 53.8 | 49.5 |
| Average Molecular Weight | 194.9 | 170.2 | 171.2 | 164.8 | 168.3 |
| CO Conversion, mol % | 47.8 | 53.4 | 81.6 | 93.8 | 100.0 |

Example 8a, 8b, 8c, 8d

The testing results are shown in Table 5 (following page).

As may be seem from Table 5, catalysts 8b, 8c and 8d showed Co metal dispersion higher than for Catalyst 8a. Catalysts that contain CoO average crystallite sizes below 16 nanometers gave a high wax cut in the FT product of 17.6-19.3% wt, whereas catalyst 8a, which contained CoO crystallites larger than 16 nm (actually, 23.06 nm) gave a lower wax cut of 7.4 weight percent in the C5+ liquid, enabling the product to be used as a diesel blend.

TABLE 5

Performance of Catalyst 8a-8d at 70 psia.

| | Catalyst | | | |
|---|---|---|---|---|
| | 8a | 8b* | 8c* | 8d* |
| Average Particle size, microns | 1963 | 274 | 359 | 718 |
| Average crystallite size, nm | 23.06 | 9.19 | 14.76 | 15.72 |
| Dispersion, % | 4.16 | 10.45 | 6.5 | 6.11 |
| Fischer-Tropsch test Temperature, ° C. | 200 | 200 | 200 | 200 |
| C5+ composition wt. %: | | | | |
| Naphtha (carbon number C6-C8) | 9.3 | 10.1 | 10.4 | 11.4 |
| Diesel (carbon number C9-C23) | 84.1 | 70.9 | 72.0 | 69.3 |
| Wax (carbon number > C23) | 6.6 | 19.0 | 17.6 | 19.3 |
| Average molecular weight, AMU | 182 | 195 | 190 | 193 |
| CO conversion, % | 52.7 | 68.8 | 72.7 | 69.3 |

*Not part of the present Application

Figure 6:
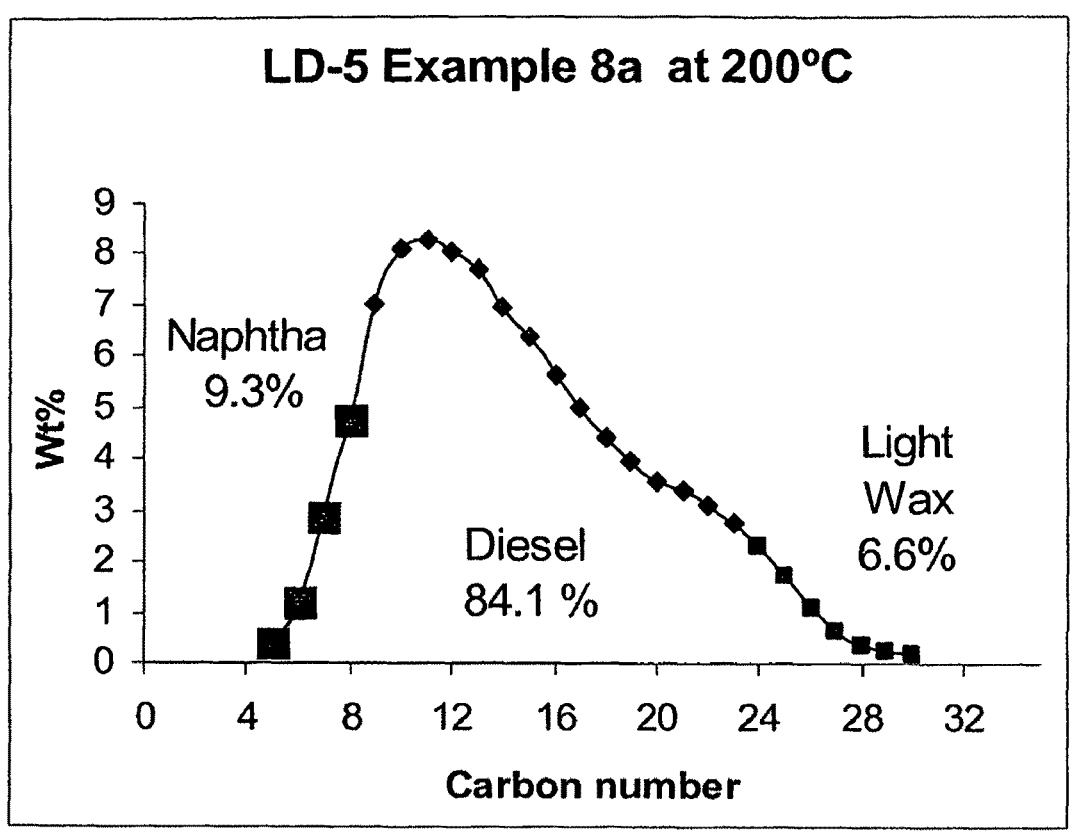
FIG. 6 is a graph showing the effect of carbon number distribution on the % weight production of liquid fuels and/or waxes, at 200° C. and 70 psia, using an LD-5 alumina support (ie. Example 8a)

FIG. 6 shows C5+ carbon number distribution for Example 8a (LD-5) at 200° C., 70 psia.

Example 9

Example 9 catalyst was tested at 70 psia.

As shown in Table 6 (below) and FIG. 7, the 190° C. hydrocarbon product contained 99.1% "naphtha plus diesel". Diesel itself was at 93.6%. There was very little light wax. Cetane number was 81. As shown in Table 8, the crystallite size was 22.22 nm and the wax fraction was 2.3%, enabling the product to be directly as a diesel fuel.

TABLE 6

Performance of Catalyst 9 (F-220) at various temperatures (pressure 70 psia).

| | Temperature, ° C. | | | |
|---|---|---|---|---|
| | 190 | 200 | 210 | 215 |
| Hydrocarbon Liquid Rate, ml/h | 0.465 | 0.757 | 0.8 | 0.733 |
| Naphtha, wt % | 5.5 | 9.2 | 20.1 | 21.5 |
| Diesel, wt % | 93.6 | 88.5 | 77.0 | 74.7 |
| Light wax, wt % | 0.9 | 2.3 | 2.9 | 3.8 |
| Diesel production, ml/h | 0.41 | 0.62 | 0.53 | 0.47 |
| Average Molecular Weight | 188.2 | 181.4 | 157.7 | 154.1 |
| CO Conversion, mol % | 50.0 | 72.2 | 94.7 | 92.2 |
| Cetane number | 81.0 | 76.0 | 67.0 | 65.0 |

Figure 7:
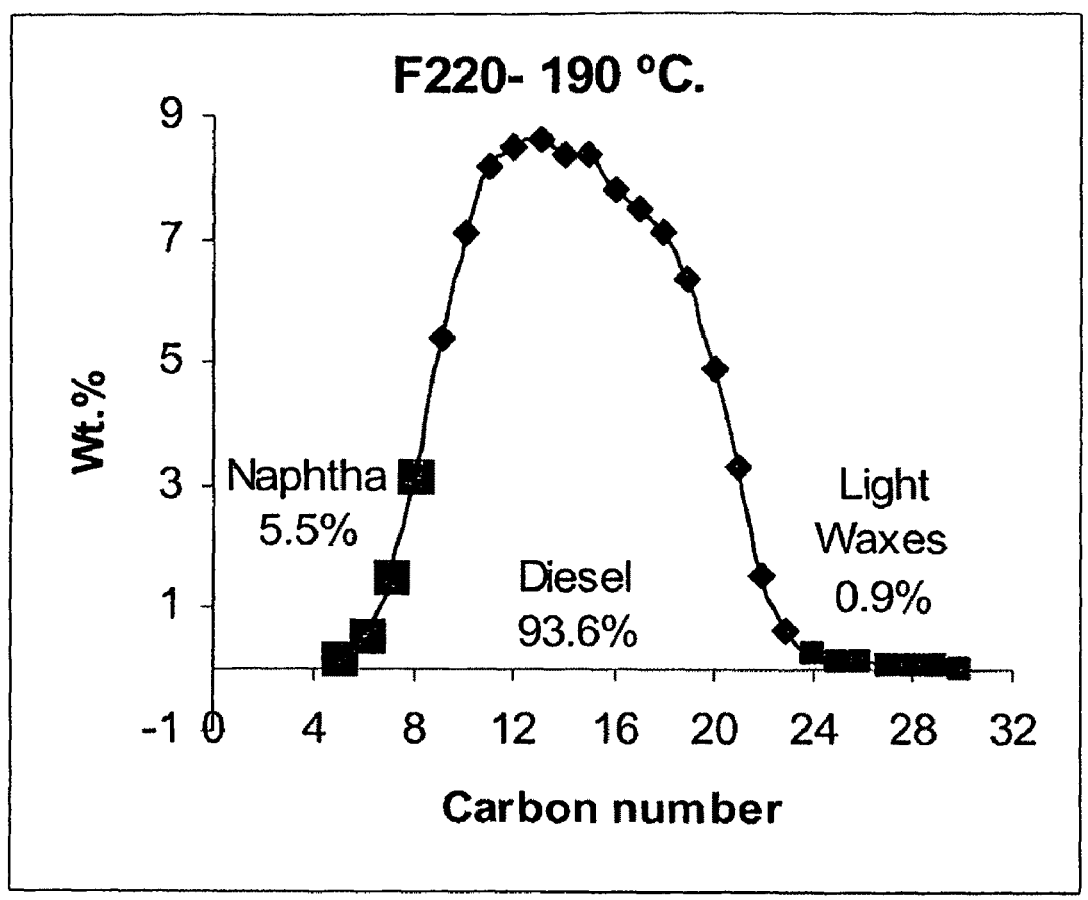
FIG. 7 is a graph showing the effect of carbon number distribution on the % weight production of liquid fuels and/or waxes, at 190° C. at 70 spia using an F-220 alumina support (ie Example 9)

FIG. 7 shows C5+ carbon number distribution for Example 9 (F-220) at 190° C., 70 psia.

Example 10

Figure 8:
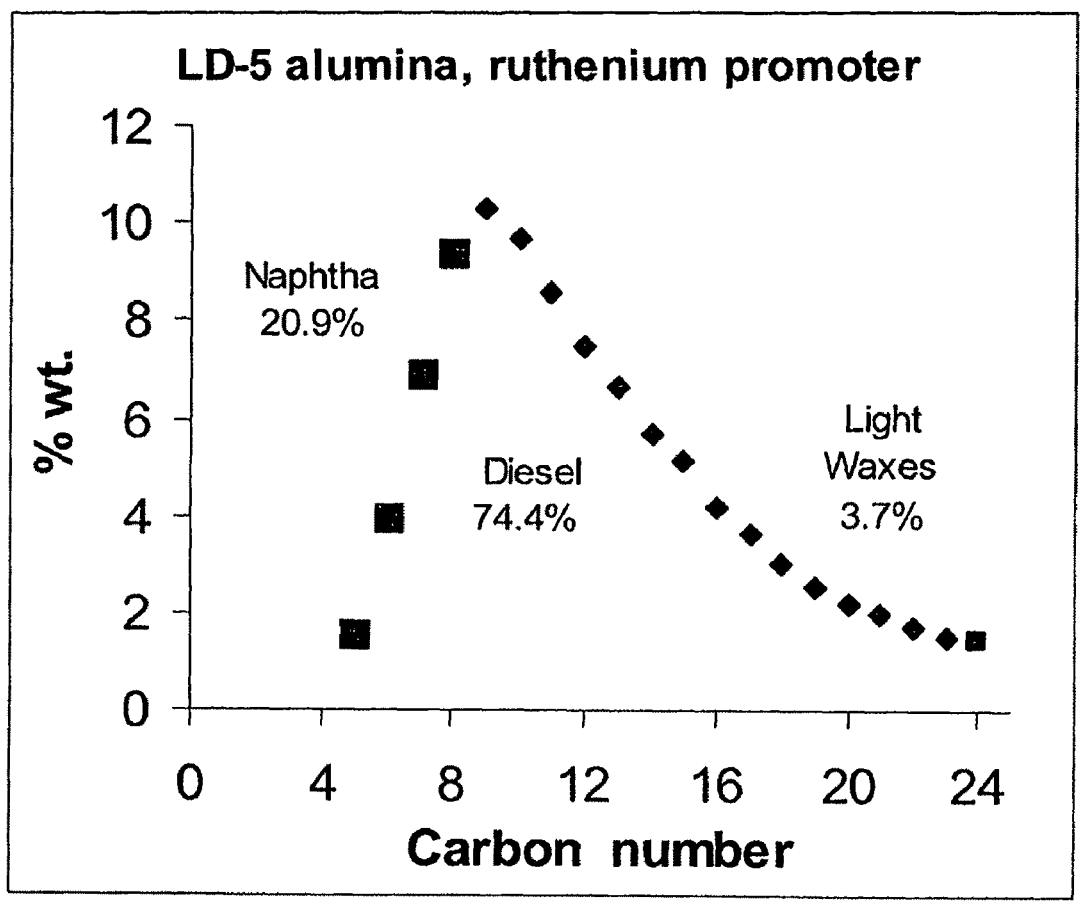
FIG. 8 is a graph showing the effect of carbon number distribution on the % weight production of liquid fuels and/or waxes, for the catalyst of Example 10 using ruthenium promoter.

Data in Table 7 (below) and FIG. 8 show that the use of ruthenium catalyst promoter instead of rhenium also provides a narrow distribution of hydrocarbons with 74.42% in the diesel range having an overall cetane number of 78. As shown in Table 8, the crystallite size was 20.89 nm and the wax fraction was 3.73%, enabling the product to be used as a diesel blend.

TABLE 7

Performance of Catalyst 10 (Ruthenium promoter, LD-5 alumina support).

| | |
|---|---|
| Temperature, ° C./Pressure, psia | 215 |
| Conversion, % | 94.64 |
| C5+ liquid rate, ml/h | 0.73 |
| Diesel production rate, ml/h | 0.54 |
| C5+ weight fractions, %: | |
| Naphtha (C6-C8) | 21.85 |
| Diesel (C9-C23) | 74.42 |
| Wax (>C23) | 3.73 |
| Cetane number | 78 |
| Average molecular weight | 164 |

FIG. 8 shows C5+ carbon number distribution for the catalyst of Example 10 using a ruthenium promoter.

Example 11

For the catalyst of Example 11, the hydrocarbon liquid production rate was 0.55 ml/h at 210° C. The carbon distribution curve shown in FIG. 9 demonstrates a narrow distribution with a high diesel cut.

As shown in Table 8 (below), the crystallite size was 33.1 nm and the wax fraction was 5.2%, enabling the product to be used as a diesel blend, perhaps after flashing off the naphtha fraction.

TABLE 8

Summary of the effect of cobalt crystallite size on C5+ wax concentration.

| | Catalyst Number | | | | |
|---|---|---|---|---|---|
| | 4 | 7 | 9 | 10 | 11 |
| Name | Trilobes | CSS-350 | F-220 | LD-5/Ru | Aerolyst 3038 |
| Average crystallite size, nm | 22.26 | 18.26 | 22.22 | 20.89 | 33.1 |
| Dispersion, % | 4.31 | 5.26 | 4.32 | 4.6 | 2.9 |
| Fischer-Tropsch test Temperature, ° C. | 202.5 | 215 | 200 | 215 | 200 |
| C5+ composition wt. %: | | | | | |
| Naphtha (carbon number C6-C8) | 19.7 | 15.4 | 9.2 | 21.85 | 20.7 |
| Diesel (carbon number C9-C23) | 73.5 | 77.4 | 88.5 | 74.4 | 74.1 |
| Wax (carbon number > C23) | 6.8 | 7.2 | 2.3 | 3.7 | 5.2 |
| Average molecular weight, AMU | 165 | 165 | 181 | 164 | 147 |
| CO conversion, % | 90.2 | 93.8 | 72.2 | 92.6 | 57.0 |

Figure 9:
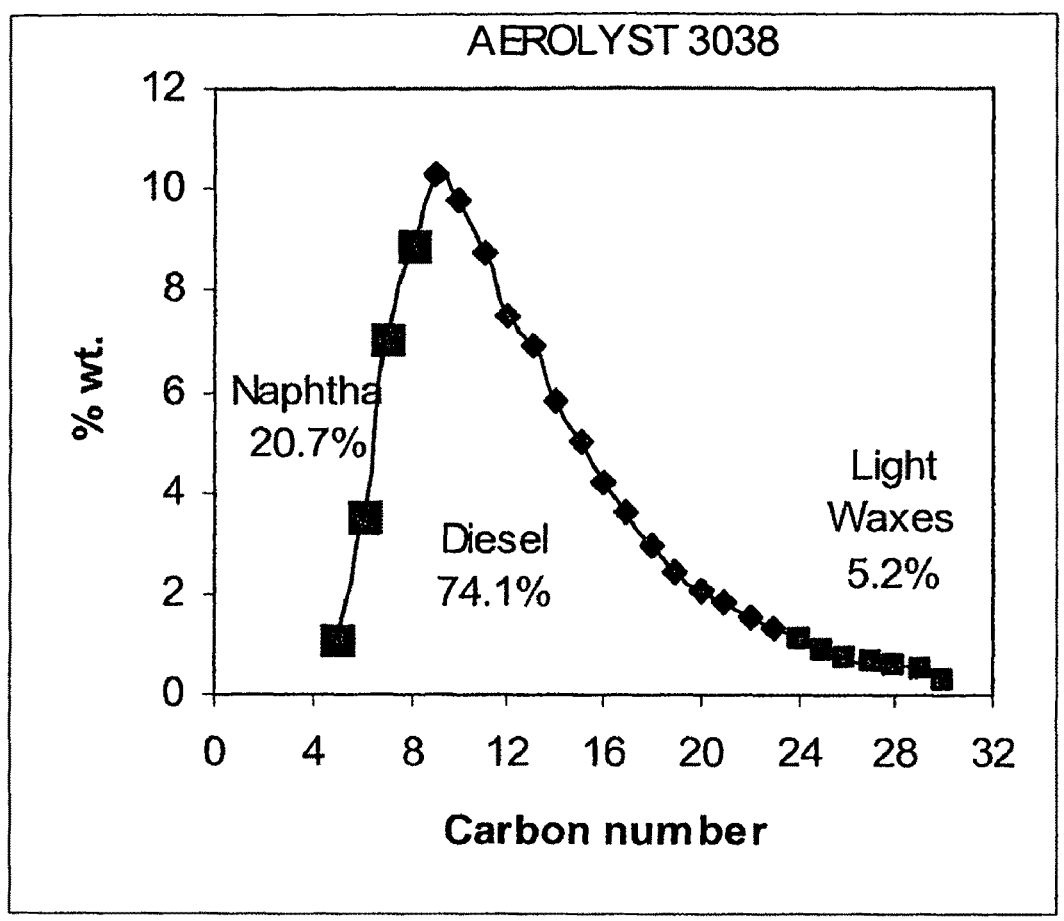
FIG. 9 is a graph showing the effect of carbon number distribution on the % weight production of liquid fuels and/or waxes for the catalyst of Example 11, using an Aerolyst 3038 silica catalyst support instead of alumina.

FIG. 9 shows a graph of the C5+ carbon number distribution for the catalyst of Example 11 (Aerolyst 3038 silica).

SUMMARY

Figure 10:
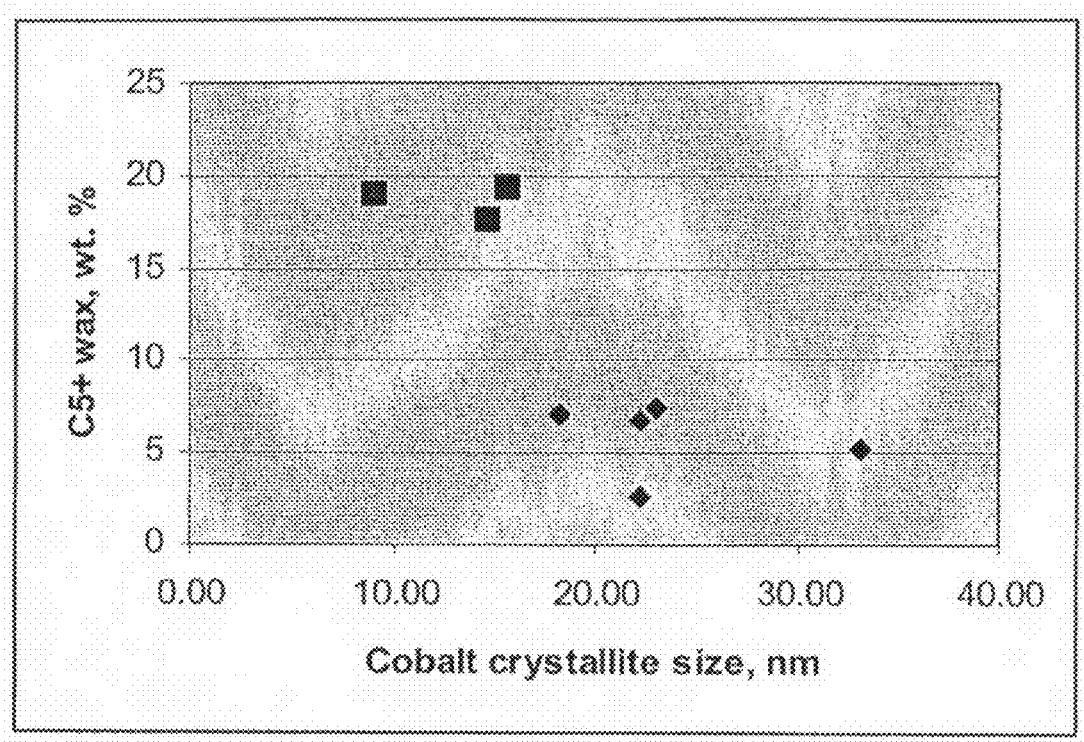
FIG. 10 is a graph showing the relationship of cobalt catalyst crystallite size to wax content of C5+ F-T product.

The catalysts of Examples 1-11 (except catalysts 8 b, c and d), as may be seen from the above discussion, show that a narrow distribution of hydrocarbons, mainly in the diesel range, having low wax content (<10 wt. %) is obtained when the FT catalyst has cobalt crystallites larger than 16 nm, as shown in FIG. 10 showing the relationship of cobalt catalyst crystallite size to wax weight content (%) of C5+ FT product [naphtha is indicated by large squares, diesel by diamonds and light waxes by small squares].

Figure 11:
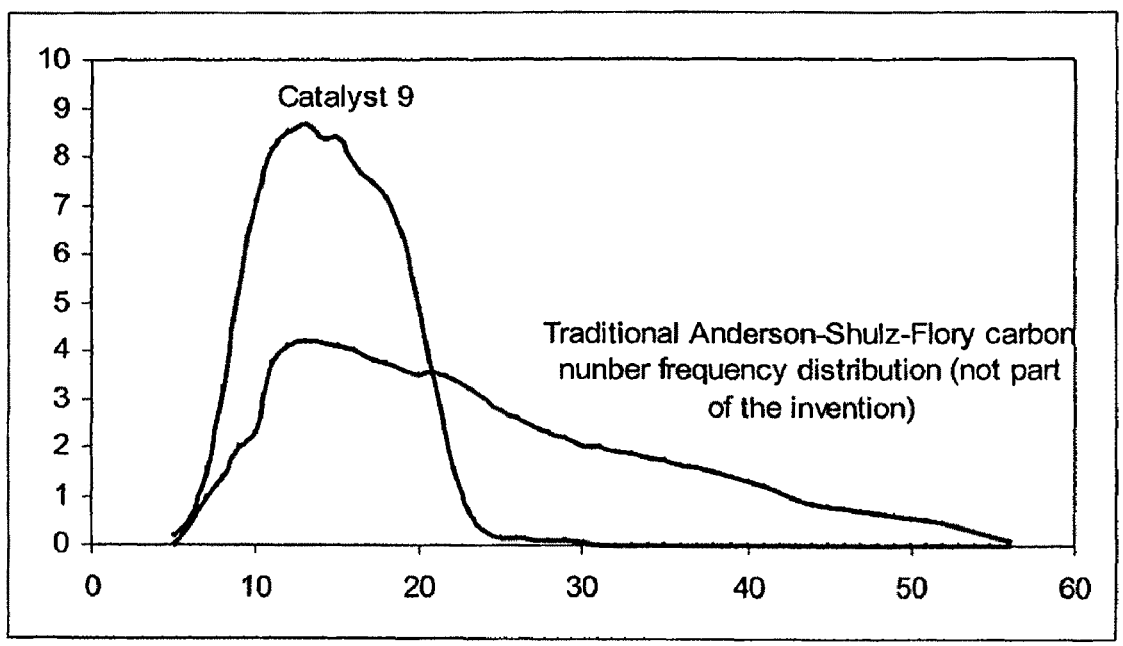
FIG. 11 is a graph showing a comparison of catalyst used in Example 9 carbon distribution with a traditional Anderson-Shultz-Flory distribution.

FIG. 11 compares this result with expectations from the Anderson-Shultz-Flory (A-S-F) carbon number distribution based on chain growth. The A-S-F distribution provides only 50 wt. % diesel fraction, whereas the present invention provides >65 wt. %.

The liquid hydrocarbon product of the present catalysts is more valuable than the broad A-S-F type of product because it can be used directly as a diesel-blending stock without hydrocracking to increase cetane number and decrease sulphur content of petroleum diesels. Because the present process is a simple once-through process, it entails low capital cost.

Although the disclosure describes and illustrates preferred embodiments of the invention, it is to be understood that the invention is not limited to these particular embodiments. Many variations and modifications will now occur to those skilled in the art. For a complete definition of the invention and its intended scope, reference is to be made to the summary of the invention and the appended Claims read together with and considered with the disclosure and drawings herein.

The invention claimed is:

1. A Fischer-Tropsch process for producing a liquid hydrocarbon substantially comprising diesel, fuel or diesel blending stock, the process producing a liquid, hydrocarbon product containing less than 10 weight percent wax ($>C_{23}$) and greater than 65% diesel ($C_9$-$C_{23}$), such Fischer-Tropsch process comprising:
   operating at pressures below 200 psia; and
   utilizing a cobalt catalyst comprising a Fischer-Tropsch catalyst support having cobalt metal crystallites thereon, said cobalt metal crystallites having an average diameter greater than 16 nanometers.

2. The process of claim 1, wherein said Fischer-Tropsch catalyst support is a catalyst support selected from the group of catalyst supports consisting of alumina, gamma alumina, zirconia, titania, silica, and mixtures thereof.

3. The process of any one of claim 1 wherein the cobalt catalyst has a metallic cobalt catalyst loading, and wherein said metallic cobalt catalyst loading is at least 15 weight %.

4. The process of any one of claim 1 wherein conversion of CO in feed gas is at least 60%.

5. The process of any one of claims 1 to 4 wherein a promoter is utilized in such process, and said promoter is selected from the group of promoters consisting of ruthenium, rhenium, rhodium, nickel, zirconium, and titanium, and mixtures thereof.

6. The process of any one of claim 1 wherein a flash distillation is conducted to reduce light hydrocarbon cuts which have lower boiling points than diesel.

7. The process of claim 1 wherein the process uses a Fischer-Tropsch reactor that does not use tailgas recycle.

8. The process of any one of claim 1-4 or 7 wherein the process uses a reformer that uses air as an oxygen source.

9. The process of any one of claim 1-4, or 7 wherein a Fischer-Tropsch reactor used in said Fischer-Tropsch process is a fixed-bed Fischer-Tropsch reactor or a slurry bubble bed Fischer-Tropsch reactor.

10. A Fischer-Tropsch process operating at less than 200 psia, using an air autothermal reformer, and having a CO conversion of at least 60% and providing a diesel yield greater than 65% by weight in a single-pass Fischer-Tropsch reactor, comprising the step of:
   using a cobalt catalyst, said catalyst having a metallic cobalt loading of at least 15% by weight and rhenium loading of less than 2% by weight, said cobalt catalyst having a catalyst support material selected from the group of catalyst support materials consisting of alumina, zirconia, silica, and, mixtures thereof and having cobalt metal crystallites thereon, said cobalt metal crystallites having an average diameter greater than 16 nanometers.

11. The process of claim 10 wherein the Fischer-Tropsch catalyst support material is comprised of gamma-alumina.

12. The process of claim 10 having a Fischer-Tropsch feed gas, wherein selective membranes or molecular sieves are employed to remove hydrogen from the Fischer-Tropsch feed gas.

13. The process of claim 10 wherein the operating pressure is at least 40 psia, and temperature in the Fischer-Tropsch reactor is at least 190° C.

14. The process of claim 10 wherein the operating pressure is less than 100 psia.

15. A Fischer-Tropsch process as claimed in claim 10, said cobalt catalyst further having a promoter, wherein said promoter comprises a promoter selected, from the group of promoters consisting of ruthenium, rhenium, and mixtures thereof.

16. A Fischer-Tropsch process having a CO conversion of at least 60% and providing a diesel yield greater than 65% by weight in a Fischer-Tropsch reactor, comprising:
operating at pressures less than 200 psia;
using an oxygen autothermal reformer; and
using a cobalt catalyst, said catalyst having a metallic cobalt loading of at least 15% by weight and a rhenium loading of less than 2% by weight, on a Fischer-Tropsch catalyst support material selected from the group of catalyst support materials consisting of alumina, zirconia, and mixtures thereof, wherein said cobalt catalyst is in the form of cobalt metal crystallites, said crystallites having an average diameter greater than 16 nanometers.

17. the process of claim 16 wherein the Fischer-Tropsch catalyst support is comprised of alumina.

18. The process of claim 16 having a tailgas from the Fischer-Tropsch reformer, wherein the tailgas is partially recycled to the reformer.

19. The process of claim 16 further having a Fischer-Tropsch reactor feed gas wherein selective membranes or molecular sieves are employed to remove hydrogen from the feed gas.

20. The process of claim 16 wherein the operating pressure is at least 40 psia, and temperature in the Fischer-Tropsch reactor is at least 190° C.

21. The process of claim 16 wherein the operating pressure is no greater than 100 psia.

22. A Fischer-Tropsch process of claim 16, said reactor further having a promoter, Wherein said promoter comprises a promoter selected from the group of promoters consisting of ruthenium, rhenium, and mixtures thereof.

23. A Fischer-Tropsch process for a Fischer-Tropsch reactor, comprising:
operating at pressures less than 200 psia;
using an oxygen steam reformer;
having a CO conversion of at least 60% and providing a diesel yield greater than 65% by weight; and
using a cobalt metal catalyst with a metallic cobalt loading of at least 15% by weight and rhenium loading of less than 2% by weight on a Fischer-Tropsch catalyst support material selected from the group of catalyst support materials consisting of alumina, zirconia, silica, and mixtures thereof, wherein said catalyst support material possesses cobalt metal crystallites, said crystallites having an average diameter greater than 16 nanometers.

24. The process of claim 23 wherein the Fischer-Tropsch catalyst support is comprised of gamma alumina.

25. The process of any one of claim 23 further having a Fischer-Tropsch reactor feed gas, wherein selective membranes or molecular sieves are employed to remove hydrogen from the feed gas.

26. The process of any one of claims 23 to 25 having a tailgas from the reformer, wherein some or all of the tailgas is burned to provide heat to the reformer.

27. The process of any one of claims 23 to 25 wherein the operating pressure is at least 40 psia and the temperature is at least 190° C.

28. The process of any one of claims 23 to 25 wherein the operating pressures are less than 100 psia.

29. A Fischer-Tropsch process of any one of claims 23 to 25, said reactor further having a promoter, wherein said promoter comprises a promoter selected from the group of promoters consisting of ruthenium, rhenium, and mixtures thereof.

30. A Fischer-Tropsch process having a CO conversion of greater than 60% and providing a diesel yield greater than 65% by weight, comprising:
operating at less than 200 psia,
using an air or oxygen partial oxidation reformer, and
using a Fischer-Tropsch reactor having a cobalt catalyst with a metallic cobalt loading greater than 15% by weight and rhenium loading of less than 2% by weight on a Fischer-Tropsch catalyst support material, said Fischer-Tropsch catalyst support material selected from the group of catalyst support materials consisting of alumina, zirconia, and silica, and mixtures thereof, Wherein said cobalt catalyst is in the form of metallic metal crystallites, said crystallites having an average diameter greater that 16 nanometers.

31. The process of claim 30 wherein the Fischer-Tropsch catalyst support is comprised of alumina.

32. The process of claim 30 or 31 having a Fischer-Tropsch reactor feed gas, wherein selective membranes or molecular sieves are employed to remove hydrogen from the feed gas.

33. The process of claim 30 wherein the operating pressure is at least 40 psia, and the temperature is at least 190° C.

34. The process of claim 30 wherein die operating pressure is less than 100 psia.

35. A Fischer-Tropsch process of claim 30, said reactor further having a promoter, wherein said promoter consists of a promoter selected from the group of promoters consisting of ruthenium, rhenium, and mixtures thereof.

36. The process as claimed in any one of claim 1, 10, 16, 23, or 30, wherein the temperature in the Fischer-Tropsch reactor is at least 190° C.

37. The process as claimed in claim 36, wherein the operating pressure is at least 40 psia, and wherein a promoter is utilized in such process and said promoter is selected, from the group of promoters consisting of: ruthenium, rhenium, rhodium, nickel, zirconium, titanium, or mixtures thereof.

38. The process as claimed in claim 37 wherein the CO conversion is greater than 65%.

* * * * *